United States Patent
Bayer

(10) Patent No.: US 10,052,799 B2
(45) Date of Patent: Aug. 21, 2018

(54) INTERNAL COOLING TOWER FOR FILM BLOWING LINES

(71) Applicant: HOSOKAWA ALPINE Aktiengesellschaft, Augsburg (DE)

(72) Inventor: Bernd Bayer, Bobingen (DE)

(73) Assignee: HOSOKAWA ALPINE AKTIENGESELLSCHAFT, Augsburg (DE)

( * ) Notice: Subject to any disclaimer, the term of this patent is extended or adjusted under 35 U.S.C. 154(b) by 45 days.

(21) Appl. No.: 14/945,948

(22) Filed: Nov. 19, 2015

(65) Prior Publication Data
US 2016/0151942 A1  Jun. 2, 2016

(30) Foreign Application Priority Data
Nov. 28, 2014  (DE) .................. 10 2014 017 556

(51) Int. Cl.
| | | |
|---|---|---|
| B29C 47/88 | (2006.01) | |
| B29C 35/16 | (2006.01) | |
| B29C 47/00 | (2006.01) | |
| B29C 55/28 | (2006.01) | |

(Continued)

(52) U.S. Cl.
CPC .......... B29C 35/16 (2013.01); B29C 47/0026 (2013.01); B29C 47/0057 (2013.01); B29C 47/883 (2013.01); B29C 47/908 (2013.01); B29C 55/28 (2013.01); B29C 2035/1658 (2013.01); B29K 2101/12 (2013.01)

(58) Field of Classification Search
CPC ............ B29C 35/16; B29C 2035/1658; B29C 47/0057; B29C 47/883; B29C 55/28
See application file for complete search history.

(56) References Cited

U.S. PATENT DOCUMENTS

| | | | | |
|---|---|---|---|---|
| 3,962,023 A | * | 6/1976 | Hofer ................. | B29C 66/63 156/514 |
| 4,080,143 A | * | 3/1978 | Upmeier ............. | B29C 47/0026 425/445 |
| 4,165,356 A | | 8/1979 | Heider | |

(Continued)

FOREIGN PATENT DOCUMENTS

| | | |
|---|---|---|
| AT | 304 058 B | 12/1972 |
| CH | 537800 | 6/1973 |

(Continued)

OTHER PUBLICATIONS

Result of Examination Report for DE 10 2014 017 556.1 dated Nov. 28, 2014.

(Continued)

*Primary Examiner* — Yogendra N Gupta
*Assistant Examiner* — Joseph S Leyson
(74) *Attorney, Agent, or Firm* — Paul D. Bianco; Katharine Davis; Fleit Gibbons Gutman Bongini & Bianco, PL

(57) ABSTRACT

An internal cooling tower for a film blowing line with one or more superimposed cooling air nozzles designed such that the entrainment of droplets consisting of low-molecular components of the raw material that diffuse during the film blowing process from the film into the flow of cooling air is prevented. This is achieved in that at the height of the nozzle gap, the top surface of the cooling air nozzles has a grooved contour both on the inside and the outside.

16 Claims, 1 Drawing Sheet

(51) Int. Cl.
B29K 101/12 (2006.01)
B29C 47/90 (2006.01)

(56) References Cited

U.S. PATENT DOCUMENTS

| | | | |
|---|---|---|---|
| 5,505,601 A * | 4/1996 | Sensen | B29C 47/0026 425/326.1 |
| 6,783,344 B1 | 8/2004 | Rudolf | |
| 2016/0257056 A1 | 9/2016 | Schumacher et al. | |

FOREIGN PATENT DOCUMENTS

| | | |
|---|---|---|
| DE | 2555848 | 6/1977 |
| DE | 2919249 A1 | 11/1979 |
| DE | 9214651 U1 | 2/1993 |
| DE | 4405462 C1 | 4/1995 |
| DE | 10029175 | 6/2001 |
| DE | 102013016898 A1 | 4/2015 |
| GB | 1331667 A | 9/1973 |

OTHER PUBLICATIONS

European Search Report and Search Opinion for EP15 00 3362 dated May 9, 2016.
Office Action for DE 10 2014 017 556.1 dated Jul. 7, 2015.

\* cited by examiner

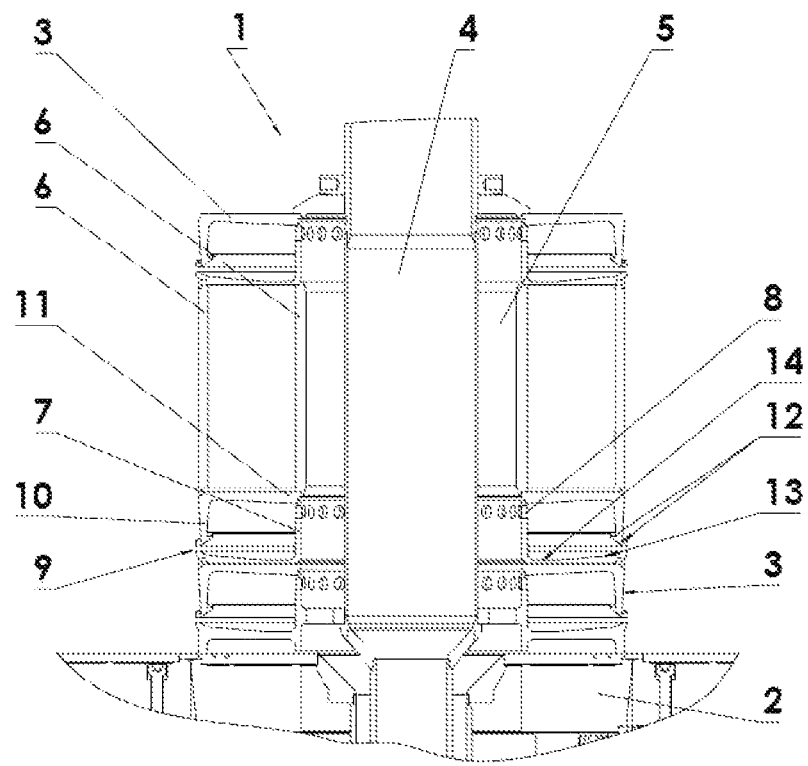

INTERNAL COOLING TOWER FOR FILM BLOWING LINES

FIELD OF THE INVENTION

The invention concerns an internal cooling tower for film blowing lines with one or more cooling air nozzles arranged on top of each other.

BACKGROUND OF THE INVENTION

Film blowing lines generally comprise at least one extruder which is connected to a film die head and which serves to melt and feed the plastic granules to the film die head. The polymer melt is distributed uniformly in the film die head and exits through the annular die. The film bubble is then taken off in longitudinal direction and as a result of the increase in pressure inside the film bubble brought about by the supplied air, is inflated to the desired diameter. A calibration basket located between the film die head and the take-off unit supports and guides the inflated film bubble. Once the film bubble has been cooled by the cooling air supplied from the inside and/or outside, the film bubble is laid flat in a take-off unit and is then wound to a reel.

An internal cooling tower serves to cool the film bubble on the inside. The cooling air is supplied to the internal cooling tower via a cooling air duct in the film die head. Dependent on the application, the internal cooling tower is made up of one or more cooling air nozzle levels. These vary in diameter and number. The cooling air is routed through the nozzles from the inside in a controlled manner to the film bubble. The film characteristics are dependent on the quality and quantity of the air.

In DE 25 55 848 A1 and DE 100 29 175 B4, film blowing lines are described that feature an internal cooling device with which the film bubble is cooled from the inside.

Different thermoplastic materials and additives are used to produce film in film blowing lines. During the film blowing process, low-molecular components of the raw materials such as monomers, paraffin or additives diffuse from the film as it is exiting the film die head. They accumulate in the air inside and outside the film bubble. These particles impact against the hot cooling tower and melt, then collect and form droplets. These droplets run down the outside wall of the cooling tower and in the cooling air nozzles right down to the nozzle gap. They then become entrained in the flow of cooling air and are catapulted against the film bubble. Contamination of the film or damage in the form of holes in the film bubble is the result.

SUMMARY OF THE INVENTION

The objective of the invention is therefore to create a solution which makes an internal cooling tower for film blowing lines possible where entrainment of the droplets originating from the low-molecular components of the raw material diffused from the film during the film blowing process is prevented.

In the case of an internal cooling tower of the type described in the introduction, the objective of the invention is solved by the characteristics of the main claim.

The internal cooling tower features cooling air nozzles which on the top side of the nozzles at the height of the nozzle gap, exhibit a grooved contour both on the inside and the outside.

An internal cooling tower is made up of several superimposed levels of cooling nozzles. The cooling nozzles are fed from a cooling air supply unit arranged concentrically around the exhaust air pipe. The cooling air nozzles are arranged concentrically around the cooling air supply unit. They are supplied with cooling air from a number of apertures arranged evenly around the periphery of the wall neighbouring the cooling air supply pipe. Other gaseous cooling media can also be used for cooling. The cooling air is blown against the film through nozzle gaps arranged radially around the outer periphery of the cooling air nozzles. Each of these cooling air nozzles consists of a top section and a bottom section.

The top sections of the nozzles have a grooved contour both inside and outside in the area that borders the nozzle gap. This results in channels both on the inside and outside at the nozzle gap in which the droplets of low-molecular components of the raw material can collect. They are thus kept away from the nozzle gap and neither become entrained in the flow of cooling air nor catapulted against the film bubble.

The inside contours of the upper and bottom sections of the nozzles have a gradient.

The inside contour of the top section of the nozzle slopes towards the cooling tower axis. This gradient means that the melted components do not drip but rather the droplets can drain off from the upper inside part of the nozzle at the back. They then collect in a droplet reservoir at the back of the bottom section of the nozzle.

The inside contour of the bottom section of the nozzle also slopes towards the cooling tower axis so that any droplets which form can flow off from the rear of the bottom section of the nozzle and collect in the droplet reservoir.

The grooves on the inside and outside of the nozzle gap and the droplet reservoir in the bottom section of the nozzle can be emptied by means of suction or drainage devices.

The top and bottom sections of the nozzles are preferably made of heat insulating materials. The top sections of the nozzles are preferably made of a phenolic resin composite material. This leads to low surface temperatures, which in turn minimises the melting of the particles.

As a result of the special contour at the nozzle gaps in the form of grooves as well as the inside contours of the top and bottom sections of the nozzles, the low-molecular components of the raw material which diffuse from the film and which impact against the surfaces of the hot cooling tower can melt there and accumulate in the form of droplets; they neither drip into the flow of cooling air nor are they catapulted against the film bubble. The film is neither contaminated nor damaged.

Brought about by the invention-specific shape of the cooling air nozzles, the intervals between cleaning the cooling devices can be significantly extended and ideally, can be avoided altogether. The cleaning effort with film blowing lines is always very high if raw materials are used that have a high content of low-molecular components. This means a considerable amount of downtime must be scheduled for cleaning the internal cooling towers.

BRIEF DESCRIPTION OF THE DRAWINGS

Other details, features and advantages of the subject matter of the invention result from the subclaims and from the following description of the associated drawings in which a preferred embodiment of the invention is shown by way of example.

FIG. 1 shows a longitudinal section through an internal cooling tower and sections of the film die head.

DETAILED DESCRIPTION

In FIG. 1, an internal cooling tower (1) with the invention-design air nozzles (3) is shown in longitudinal section. Part of the film die head (2) can be seen underneath the internal cooling tower (1) upon which the internal cooling tower (1) is mounted. The exhaust air pipe (4) routes the heated cooling air from the film bubble through the internal cooling tower (1) and out of the film die head (2). The cooling air supply duct (5) is arranged concentrically around the exhaust air pipe (4). These pipes (4, 5) are surrounded concentrically by one or more cooling air nozzles (3). The cooling air nozzles (3) can also have a clearance from each other in lengthwise direction brought about by cylindrical spacers (6). The cooling air nozzles (3) are supplied from the cooling air supply duct (5) with cooling air which is routed via air apertures (8) distributed uniformly around the circumference of the radial inside wall (7). The cooling air is routed via the radial outside nozzle gaps (9) to the film bubble.

The front cooling air nozzle wall (10) which belongs to the top section of the nozzle (11) in the illustrated embodiment features a grooved contour (12) in the area of the nozzle gap (9) at the inside and outside of the nozzle. These grooves (12) serve to collect the droplets of the low-molecular components of the raw material which melt on the hot internal cooling tower and run down the vertical or almost vertical surfaces.

The front cooling nozzle wall (10) can be of uniform thickness. In another invention design, the front cooling nozzle wall (10) tapers towards the bottom. As a result, the inside wall slopes towards the outside and the outside wall slopes towards the inside.

The inside contour of the top section of the nozzle (11) also has a gradient. This is such that it slopes radially towards the inside so that the droplets which precipitate on this surface can flow off radially towards the inside and on to the rear cooling nozzle wall (7).

The inside contour of the bottom section of the nozzle (13) also slopes radially towards the inside and to the rear cooling nozzle wall (7).

A droplet reservoir (14) is located at the lowest point of the cooling air nozzle (3). The inside contour of the bottom section of the nozzle (13) can also be designed to have a centred droplet reservoir (14) towards which the bottom of the nozzle slopes from both sides. The droplet reservoir (14) can also be located off centre.

The droplets which collect in the droplet reservoir (14) and in the grooves (12) in the outside and inside area of the nozzle gap (9) can be emptied out by means of a suction or drainage device not shown here.

The gradients of the inside contours of the top and bottom sections of the nozzles can vary across the radius.

LEGEND

1 Internal cooling tower
2 Film die head
3 Cooling air nozzle
4 Exhaust air pipe
5 Cooling air supply unit
6 Spacer
7 Rear cooling air nozzle wall
8 Air aperture
9 Nozzle gap
10 Front cooling air nozzle wall
11 Top section of nozzle
12 Grooved contour (grooves)
13 Bottom section of nozzle
14 Droplet reservoir

The invention claimed is:

1. An internal cooling tower for a film-blowing line comprising one or more cooling nozzles arranged one on top of another, each of the one or more cooling nozzles having a top section and a bottom section, the top section having a grooved contour on both an inside and an outside of the cooling nozzle in an area adjacent a nozzle gap, wherein the grooved contour forms channels on the inside and the outside of the cooling nozzle in the area adjacent the nozzle gap, and wherein the channels are configured to collect monomer droplets.

2. The internal cooling tower according to claim 1, wherein the one or more cooling nozzles are arranged concentrically around a cooling air supply unit.

3. The internal cooling tower according to claim 1, wherein the one or more cooling nozzles are separated by spacers.

4. The internal cooling tower according to claim 1, further comprising a suction or a drainage device within the grooved contour.

5. The internal cooling tower according to claim 1, wherein an inside contour of the top section of each of the one or more cooling nozzles has a gradient.

6. The internal cooling tower according to claim 5, wherein the top section and the bottom section of each of the one or more cooling nozzles is composed of heat-insulating materials.

7. The internal cooling tower according to claim 6, wherein the top section of each of the one or more cooling nozzles is composed of a phenolic resin composite material.

8. The internal cooling tower according to claim 5, wherein the gradient extends in a radial direction towards an interior of the internal cooling tower.

9. The internal cooling tower according to claim 8, further comprising a droplet reservoir at a lowest point of each of the one or more cooling nozzles.

10. An internal cooling tower for a film-blowing line comprising one or more cooling nozzles arranged one on top of another, each of the one or more cooling nozzles having a top section and a bottom section, the top section having a grooved contour on both an inside and an outside of the cooling nozzle in an area adjacent a nozzle gap, where an inside contour of the top section of each of the one or more cooling nozzles has a gradient, and where the gradient extends in a radial direction towards an interior of the internal cooling tower,
wherein the internal cooling tower further comprises a droplet reservoir at a lowest point of each of the one or more cooling nozzles, the droplet reservoir comprising a suction or a drainage device.

11. The internal cooling tower according to claim 1, wherein an inside contour of the bottom section of each of the one or more cooling nozzles has a gradient.

12. The internal cooling tower according to claim 11, wherein the top section and the bottom section of each of the one or more cooling nozzles is composed of heat-insulating materials.

13. The internal cooling tower according to claim 12, wherein the top section of each of the one or more cooling nozzles is composed of a phenolic resin composite material.

14. The internal cooling tower according to claim 11, wherein the gradient extends in a radial direction towards an interior of the internal cooling tower.

15. The internal cooling tower according to claim 14, further comprising a droplet reservoir at a lowest point of each of the one or more cooling nozzles.

16. An internal cooling tower for a film-blowing line comprising one or more cooling nozzles arranged one on top of another, each of the one or more cooling nozzles having a top section and a bottom section, the top section having a grooved contour on both an inside and an outside of the cooling nozzle in an area adjacent a nozzle gap, where an inside contour of the bottom section of each of the one or more cooling nozzles has a gradient, and where the gradient extends in a radial direction towards an interior of the internal cooling tower,
    wherein the internal cooling tower further comprises a droplet reservoir at a lowest point of each of the one or more cooling nozzles, the droplet reservoir comprising a suction or a drainage device.

* * * * *